(12) United States Patent  
Teramoto et al.

(10) Patent No.: US 7,864,275 B2  
(45) Date of Patent: Jan. 4, 2011

(54) LIQUID CRYSTAL DISPLAY DEVICE WITH A LIGHT BLOCKING FILM FORMED ON A SURFACE OF A SUBSTRATE THAT SURROUNDS A PHASE DIFFERENCE FILM AND AN ORIENTATION FILM ALSO FORMED ON THE SUBSTRATE SURFACE BETWEEN THE SUBSTRATE AND THE PHASE DIFFERENCE FILM

(75) Inventors: Masahiro Teramoto, Mobara (JP); Junji Tanno, Chiba (JP)

(73) Assignee: Hitachi Displays, Ltd., Chiba (JP)

( * ) Notice: Subject to any disclaimer, the term of this patent is extended or adjusted under 35 U.S.C. 154(b) by 175 days.

(21) Appl. No.: 12/190,631

(22) Filed: Aug. 13, 2008

(65) Prior Publication Data
US 2009/0046213 A1 Feb. 19, 2009

(30) Foreign Application Priority Data
Aug. 17, 2007 (JP) .............................. 2007-212827

(51) Int. Cl.
G02F 1/1335 (2006.01)
(52) U.S. Cl. ....................................... 349/114; 349/110
(58) Field of Classification Search .................. 349/110, 349/111, 114, 117–121, 155
See application file for complete search history.

(56) References Cited
U.S. PATENT DOCUMENTS
2005/0078255 A1* 4/2005 Hiroshi ....................... 349/141
2005/0264731 A1* 12/2005 Itou et al. .................... 349/114
2007/0263143 A1* 11/2007 Igeta et al. ................... 349/110

* cited by examiner

Primary Examiner—John Heyman
(74) Attorney, Agent, or Firm—Antonelli, Terry, Stout & Kraus, LLP.

(57) ABSTRACT

In a liquid crystal display device into which a phase difference film is incorporated on the color filter substrate side, the phase difference film can be formed more easily than the prior art. A pair of substrates and a liquid crystal display panel having a liquid crystal sandwiched between the above described pair of substrates are provided in such a manner that the above described liquid crystal display panel has a number of subpixels, each subpixel in the above described number of subpixels has a transmission portion and a reflection portion, and a first substrate from among the above described pair of substrates has: a light blocking film which is formed at least in a border between the above described transmission portion and the above described reflection portion and at least has a portion which surrounds only the above described reflection portion; an orientation film for orienting the phase difference film formed on the above described light blocking film; a phase difference film formed inside the portion surrounded by the above described light blocking film on the above described orientation film; a color filter formed on the above described phase difference film; and a flattened film formed on the above described color filter.

12 Claims, 7 Drawing Sheets

(a)

(b)

(a)

(b)

LIQUID CRYSTAL DISPLAY DEVICE WITH A LIGHT BLOCKING FILM FORMED ON A SURFACE OF A SUBSTRATE THAT SURROUNDS A PHASE DIFFERENCE FILM AND AN ORIENTATION FILM ALSO FORMED ON THE SUBSTRATE SURFACE BETWEEN THE SUBSTRATE AND THE PHASE DIFFERENCE FILM

The present application claims priority from Japanese application JP2007-212827 filed on Aug. 17, 2007, the content of which is hereby incorporated by reference into this application.

BACKGROUND OF THE INVENTION (1) Field of the Invention

The present invention relates to a liquid crystal display device, and in particular, to a semi-transmission type liquid crystal display device into which a phase difference film is incorporated on the color filter substrate side.

(2) Related Art Statement

Semi-transmission type liquid crystal display devices are known which have a transmission portion and a reflection portion within one subpixel and are used as a display for a portable apparatus (see the following Patent Document 1).

FIG. 7 is a cross sectional diagram schematically showing a main portion of the configuration of one subpixel in a conventional semi-transmission type liquid crystal display device having an IPS system, which is the semi-transmission type liquid crystal display device having an IPS system shown in FIG. 6 of the following Patent Document 1.

In the figure, SUB1 is a first substrate (which is also referred to as TFT substrate), and a thin film transistor for forming an active element, a facing electrode (CT), a reflection layer (RAL), an interlayer insulating film (PAS), a pixel electrode (PX) and an orientation film (AL1) are formed on the first substrate (SUB1). Here, in FIG. 7, interlayer insulating films other than PAS which are formed on the facing electrode (CT) side are omitted.

In addition, SUB2 is a second substrate (which is also referred to as color filter substrate), and a light shielding film (BM), an incorporated phase difference film (RET), a color filter (CF), a flattened film (OC), a step forming layer (MR) and an orientation film (AL2) are formed on the second substrate (SUB2).

Here, polarization plates (POL1, POL2) are formed on the outside of the first substrate (SUB1) and the second substrate (SUB2), respectively. In addition, in the semi-transmission type liquid crystal display device shown in FIG. 7, the main surface side of the second substrate (SUB2) is a viewed side.

In the semi-transmission type liquid crystal display device shown in FIG. 7, light is blocked in the periphery of one subpixel region by the light blocking film (BM) formed on the second substrate (SUB2) side, and therefore, in the semi-transmission type liquid crystal display device shown in FIG. 7, the region (PT) which functions as a substantial one subpixel region is the opening of the light blocking film (BM). This region (PT) is divided into a transmission portion 30 and a reflection portion 31, and the step forming layer (MR), the incorporated phase difference film (RET) and the reflection layer (RAL) are formed in the reflection portion 31.

Here, the prior art documents relating to the present invention include the following.

[Patent Document 1] Japanese Unexamined Patent Publication 2006-98623

SUMMARY OF THE INVENTION

Problem to be Solved by the Invention

In the semi-transmission type liquid crystal display device described in the above Patent Document 1, the incorporated phase difference film (RET) is incorporated on the second substrate (SUB2) side, and therefore, it is possible to achieve compatibility in the optical properties between the transmission portion 30 and the reflection portion 31.

The phase difference resist for forming the incorporated phase difference film (RET), however, is repelled and cannot be applied well due to a lack of wettability, and thus, in some cases, it is difficult in the semi-transmission type liquid crystal display device described in the above Patent Document 1 to form a patterned incorporated phase difference film (RET).

The present invention is provided in order to solve the above described problem with the prior art, and an object of the present invention is to provide a technology for making it possible to form a phase difference film more easily than the prior art to a liquid crystal display device into which a phase difference film is incorporated on the color filter substrate side.

The above described and other objects as well as novel features of the present invention will be clarified with the description of the present specification and the accompanying drawings.

Means for Solving Problem

The summary of a typical invention from among those disclosed in the present application is briefly described as follows.

(1) A pair of substrates and a liquid crystal display panel having a liquid crystal sandwiched between the above described pair of substrates are provided in such a manner that the above described liquid crystal display panel has a number of subpixels, each subpixel in the above described number of subpixels has a transmission portion and a reflection portion, and a first substrate from among the above described pair of substrates has: a light blocking film which is formed at least in a border between the above described transmission portion and the above described reflection portion and at least has a portion which surrounds the above described reflection portion; an orientation film for orienting the phase difference film formed on the above described light blocking film; a phase difference film formed inside the portion surrounded by the above described light blocking film on the above described orientation film; a color filter formed on the above described phase difference film; and a flattened film formed on the above described color filter.

(2) In (1), a second substrate from among the above described pair of substrates has a pixel electrode and a facing electrode, and the surface of the above described first substrate on the side opposite to the above described liquid crystal is a display surface.

(3) In (2), an interlayer insulating film formed in a layer above the above described facing electrode is provided, and the above described pixel electrode overlaps the above described facing electrode and is formed in a layer above the above described interlayer insulating film.

(4) In (2) or (3), the second substrate from among the above described pair of substrates has a reflection layer formed in the above described reflection portion.

(5) In (4), the above described facing electrode is formed on the above described reflection layer.

(6) In any of (1) to (5), the above described orientation film is formed only in the region where the above described phase difference film is formed.

(7) In any of (1) to (6), a step forming layer is provided which is formed in the region where the above described phase difference film is formed on the above described flattened film.

(8) In (7), a spacer in columnar form formed on the above described step forming layer is provided.

(9) In any of (1) to (8), the above described phase difference film is formed of a polymer liquid crystal material.

(10) In any of (1) to (9), the above described light blocking film is formed around one subpixel and in a border between the above described transmission portion and the above described reflection portion.

(11) In any of (1) to (9), the above described light blocking film is formed only around the above described reflection portion.

(12) In any of (1) to (9), when subpixels adjacent to each other are a first subpixel and a second subpixel, no light blocking film is formed in a border between a reflection portion in the above described first subpixel and a reflection portion in the above described second subpixel.

Effects of the Invention

The effects gained by a typical invention from among the inventions disclosed in the present application are briefly described as follows.

The liquid display device into which a phase difference film is incorporated on the color filter substrate side according to the present invention makes it possible to form the phase difference film more easily than the prior art.

EXPLANATIONS OF NUMERALS 10 ultraviolet rays
11 photomask
30 transmission type
31 reflection portion
LC liquid crystal layer
SUB1, SUB2 substrates
TFT thin film transistor
BM light shielding film
PAS, PAS1, PAS2, PAS3 interlayer insulating films
MR step forming layer
PX pixel electrode
CT facing electrode
RAL reflection layer
RET incorporated phase difference film
CF color filter
OC flattened film
AL, AL1, AL2 orientation films
SPA spacer in columnar form
POL1, POL2 polarization plates

DETAILED DESCRIPTION OF THE INVENTION

In the following, the embodiments of the present invention are described in detail in reference to the drawings.

Here, the same symbols are attached to parts having the same functions throughout all the drawings illustrating the embodiments, and repeated descriptions are omitted.

Figure 1:
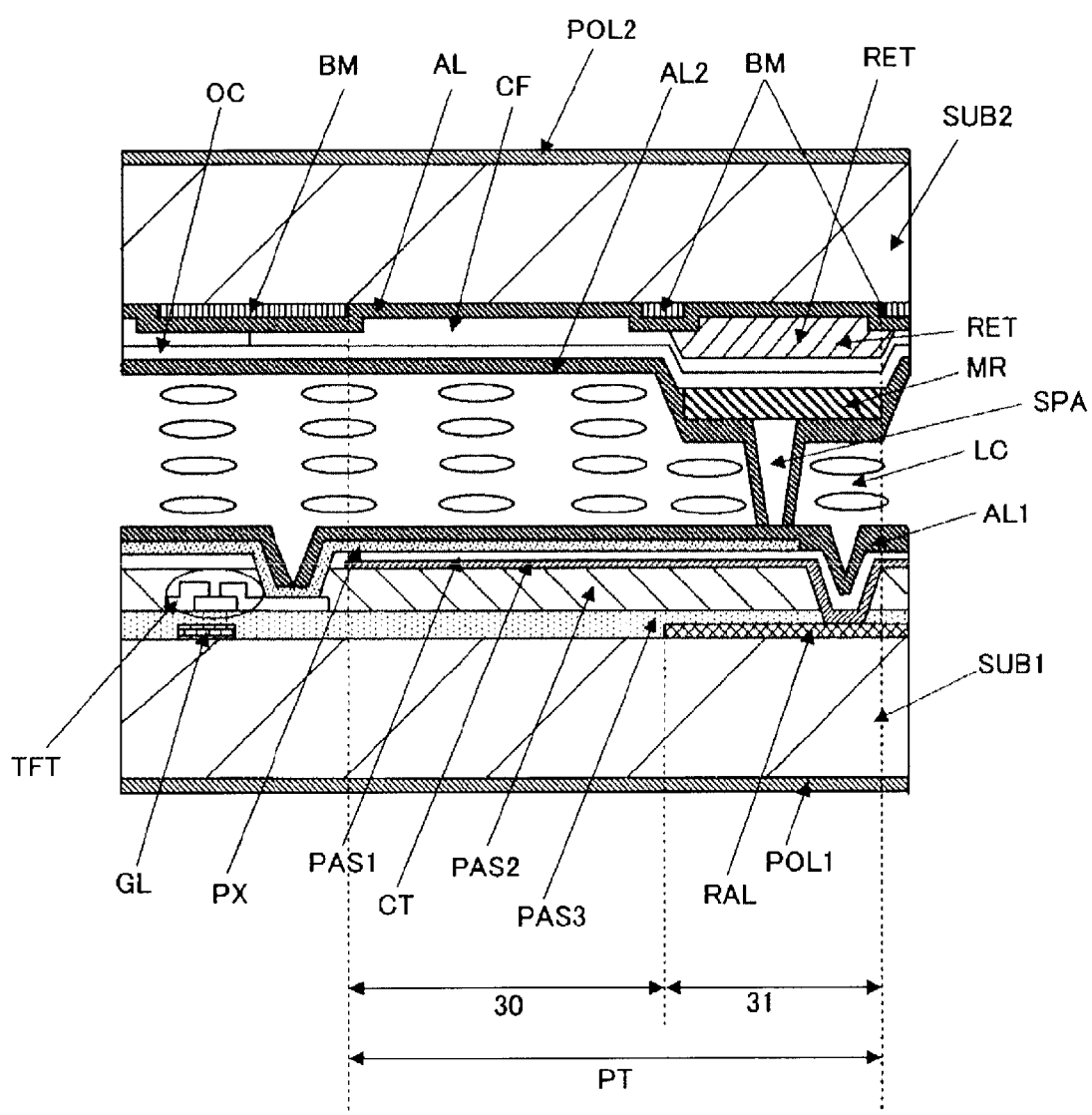
FIG. 1 is a cross sectional diagram schematically showing a main portion in the cross sectional structure of one subpixel in the semi-transmission type liquid crystal display device according to an embodiment of the present invention.
Figure 2:
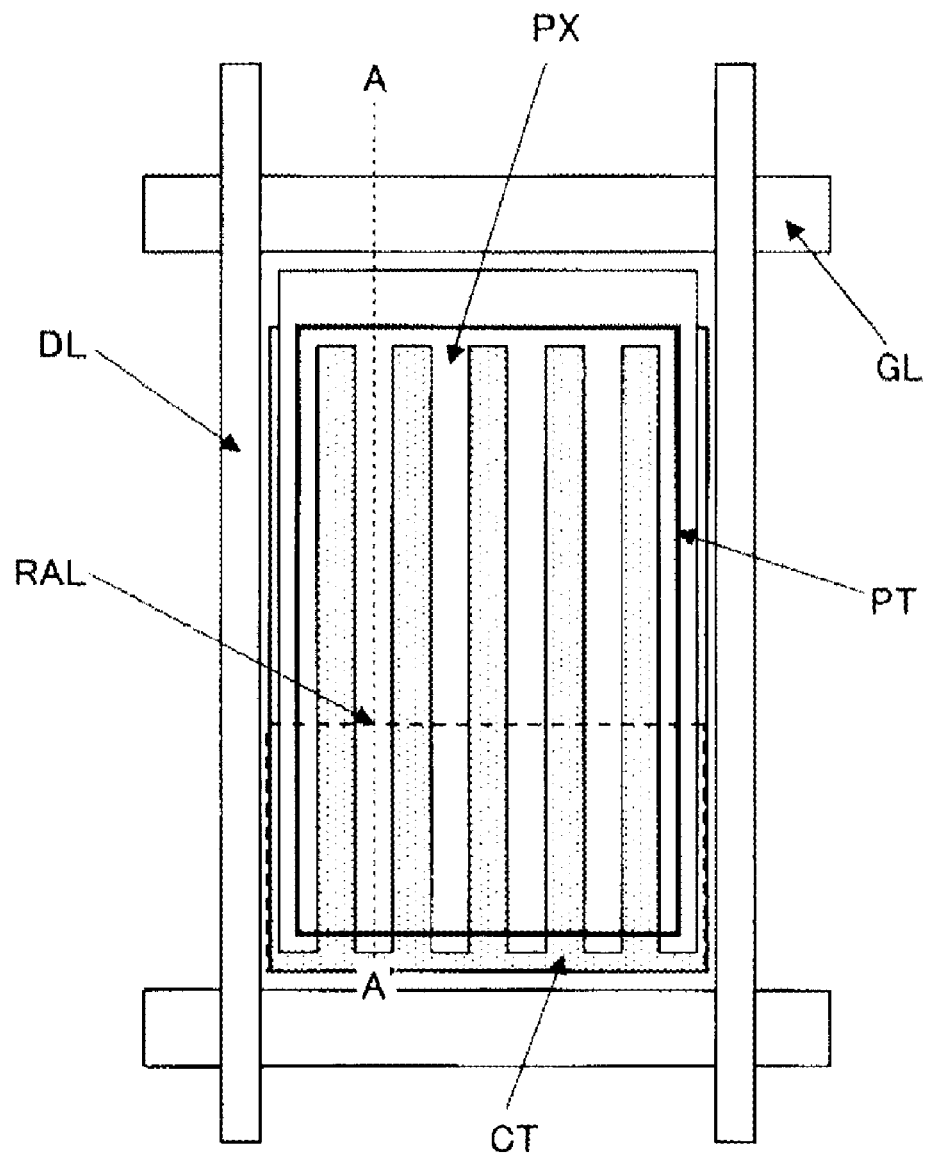
FIG. 2 is a plan diagram showing an electrode structure of the semi-transmission type liquid crystal display device according to an embodiment of the present invention.

FIG. 1 is a cross sectional diagram schematically showing a main portion of the cross sectional structure of one subpixel of the semi-transmission type liquid crystal display device according to an embodiment of the present invention. FIG. 2 is a plan diagram showing the electrode structure of the semi-transmission type liquid crystal display device according to an embodiment of the present invention. Here, FIG. 1 is a cross sectional diagram showing the cross sectional structure along line A-A' of FIG. 2.

In the semi-transmission type liquid crystal display device according to the present embodiment, a first substrate (SUB1) and a second substrate (SUB2) are provided so as to sandwich a liquid crystal layer (LC). In the semi-transmission type liquid crystal display device according to the present embodiment, the main surface side of the second substrate (SUB2) is a viewed side.

As shown in FIG. 1, a scanning line (which is also referred to as gate line) (GL) or a reflection layer (RAL), an interlayer insulating film (PAS3), a video line (which is also referred to as source line or drain line, not shown) (DL) or a thin film transistor (TFT), an interlayer insulating film (PAS2), a facing electrode (which is also referred to as common electrode) (CT), an interlayer insulating film (PAS1), a pixel electrode (PX) and an orientation film (AL1) are formed on the liquid crystal layer side of the first substrate (which is also referred to as TFT substrate) (SUB1) sequentially from the first substrate (SUB1) to the liquid crystal layer (LC). Here, a polarization plate (POL1) is formed on the outside of the first substrate (SUB1). In addition, the reflection layer (RAL) is connected to the facing electrode (CT), and the same drive voltage as that for the facing electrode (CT) is supplied to the reflection layer (RAL). Here, the reflection layer (RAL) may be a diffuse reflection layer where unevenness is created on the surface.

A light shielding film (BM), an orientation film (AL) for orienting an incorporated phase difference film, the incorporated phase difference film (RET), a color filter for red, green and blue (CF), a flattened film (OC), a step forming layer (MR) and an orientation film (AL2) are formed on the liquid crystal layer side of a second substrate (which is also referred to as color filter substrate) (SUB2) sequentially from the second substrate (SUB2) to the liquid crystal layer (LC). Here, a polarization plate (POL2) is formed on the outside of the second substrate (SUB2).

In addition, as shown in FIG. 2, the facing electrode (CT) is formed in plane form, and the pixel electrode (PX) is a comb shaped electrode having a number of linear electrodes. In general, the pixel electrode (PX) and the facing electrode (CT) are formed of a transparent conductive film, such as of ITO (indium tin oxide), or the like. Furthermore, the pixel electrode (PX) and the facing electrode (CT) overlap via the interlayer insulating film (PAS1), and as a result, a capacitor is formed. Here, the interlayer insulating film (PAS1) is not limited to being one layer, but may be of two or more layers.

Here, as shown in FIG. 2, one subpixel is formed within a rectangular region surrounded scanning lines (GL) and video lines (DL). Light is shielded by the light shielding film (BM) formed on the second substrate (SUB2) side in the region where this one subpixel is formed, and therefore, the region (PT) which functions as the region where one subpixel is substantially formed is the opening of the light shielding film (BM). In addition, FIG. 2 shows the reflection layer (RAL) with broken lines.

In the present embodiment, the reflection layer (RAL) is formed on the first substrate (SUB1) side. The region where this reflection layer (RAL) is formed is a reflection portion 31, and light entering through the second substrate (SUB2) side is reflected from the reflection layer (RAL) in the reflection portion 31.

In addition, the region where the reflection layer (RAL) is not formed is a transmission portion 30, and illumination light from a backlight arranged on the rear side of the first substrate (SUB1) passes through the transmission portion 30 and is emitted through the main surface side of the second substrate (SUB2).

The reflection layer (RAL) may be a metal film, such as of aluminum (Al), or may have a two-layer structure of molybdenum (Mo) in the lower layer and aluminum (Al) in the upper layer.

In the semi-transmission type liquid crystal display device according to the present embodiment, the linear pixel electrode (PX) and the facing electrode in plane form (CT) are layered on top of each other via the interlayer insulating film (PAS1) so that lines of electric force in arch form formed between the pixel electrode (PX) and the facing electrode (CT) are distributed so as to penetrate through the liquid crystal layer (LC), and thus, the orientation of the liquid crystal layer (LC) is changed.

In the present embodiment, the gap between the first substrate (SUB1) and the second substrate (SUB2) is set to a predetermined length by the spacer in columnar form (SPA), and the length of the gap between cells in the reflection portion 31 is set at approximately half of the length of the gap between cells in the transmission portion 30 due to the step forming layer (MR). This is because light passes through the reflection portion 31 twice, traveling forward and then backwards, and the light path length should be the same in the transmission portion 30 and the reflection portion 31.

The brightness and darkness of light are displayed using the birefringence of the liquid crystal layer (LC) in the transmission portion 30, while the brightness and darkness of light are displayed using the birefringence of the incorporated phase difference film (RET) and the liquid crystal layer (LC) arranged inside the liquid crystal display panel in the reflection portion.

Figure 3:
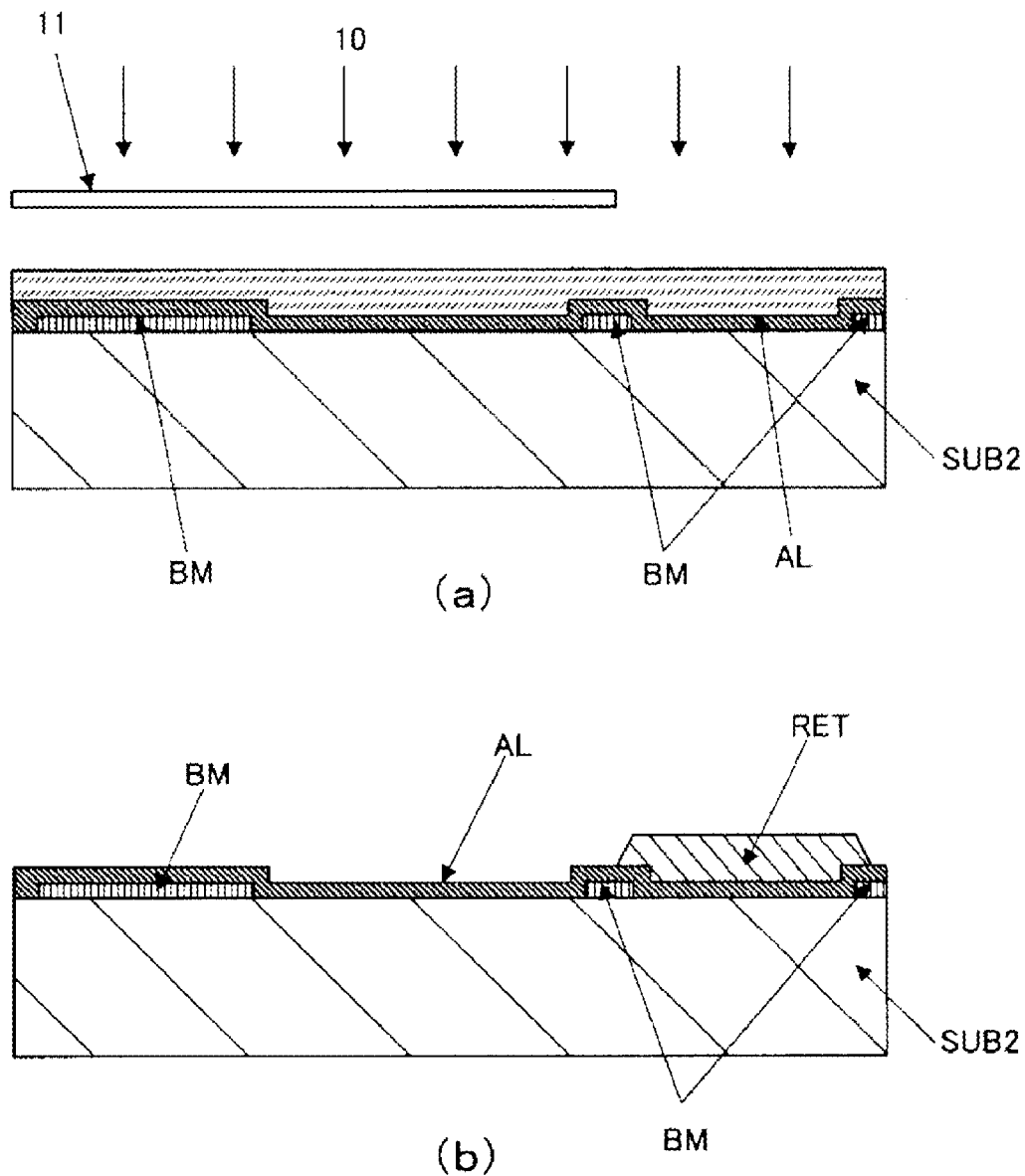
FIG. 3 is a diagram illustrating a manufacturing method for the second substrate shown in FIG. 1.

FIG. 3 is a diagram illustrating a manufacturing method for the second substrate (SUB2) shown in FIG. 1.

In the present embodiment, the second substrate (SUB2) shown in FIG. 1 is formed in accordance with the following method, for example.

As shown in FIG. 3(a), a light shielding film (BM) is formed on the second substrate (SUB2). This light shielding film (BM) is formed using a publicly known photoetching technique, for example.

Next, an orientation film (AL) for an incorporated phase difference film is formed on this light shielding film (BM), and an orientation process is carried out on this orientation film (AL) in accordance with a rubbing method. Here, the orientation film (AL) has a function of determining the direction of the late phase axis of the incorporated phase difference film (RET).

Next, a phase difference resist (for example, an organic solvent including a liquid crystal having a photoreactive acryl group at a terminal of the molecule and a reaction initiator) is applied onto the orientation film (AL), and the organic solvent is removed through heating. At this point in time, the photoreactive liquid crystal is oriented in the direction of the orientation process for the orientation film (AL).

Next, the acryl group is photopolymerized through irradiation with ultraviolet rays 10 via the photomask 11 so that the portion irradiated with ultraviolet rays 10 is cured. Next, the unexposed portion which is not irradiated with ultraviolet rays 10 is eluded in an organic solvent for development, and thus, as shown in FIG. 3(b), an incorporated phase difference film (RET) patterned in the same manner as the reflection portion 31 is formed. Subsequently, a color filter (CF), a flattened film (OC), a step forming layer (MR), a spacer in columnar form (SPA) and an orientation film (AL2) are formed. Here, the flattened film (OC), the step forming layer (MR) and the spacer in columnar form (SPA) may not be formed if unnecessary.

Figure 4:
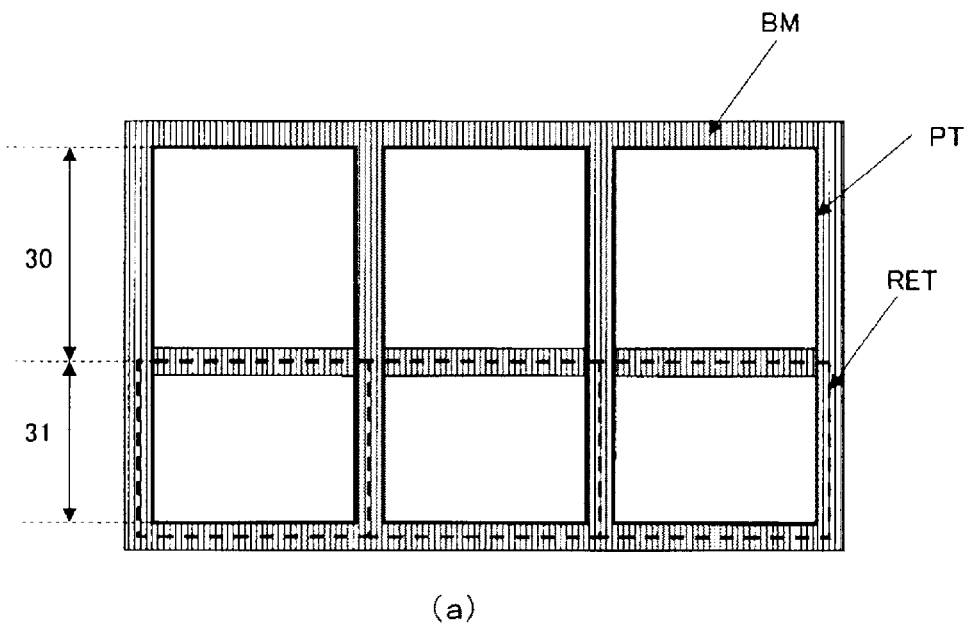
FIG. 4 is a diagram showing a light shielding film (BM) of the semi-transmission type liquid crystal display device according to an embodiment of the present invention.
Figure 4:
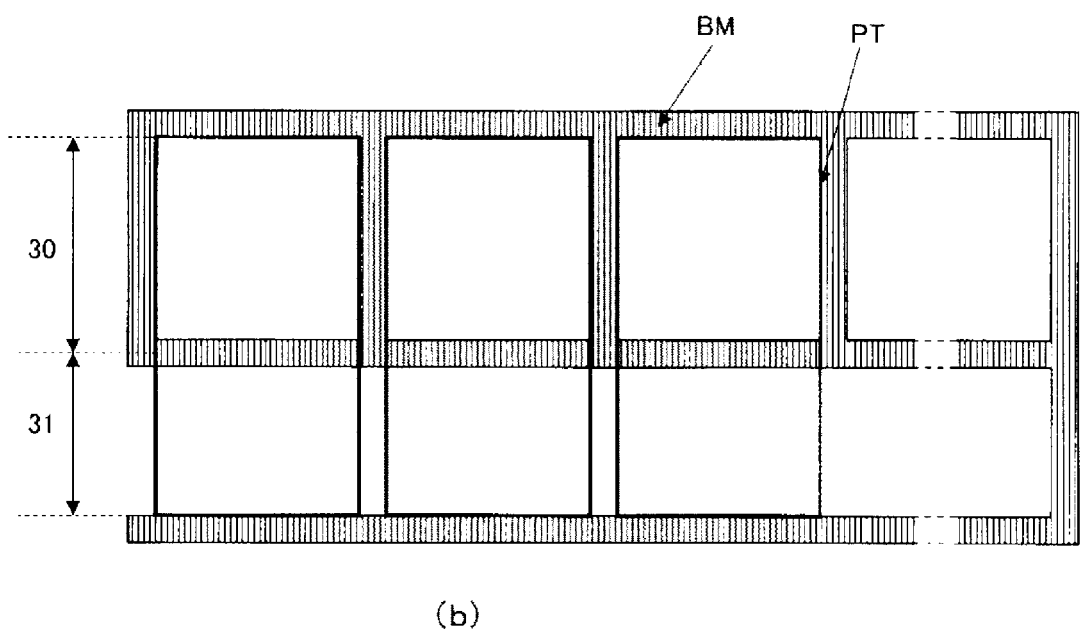
Figure 5:
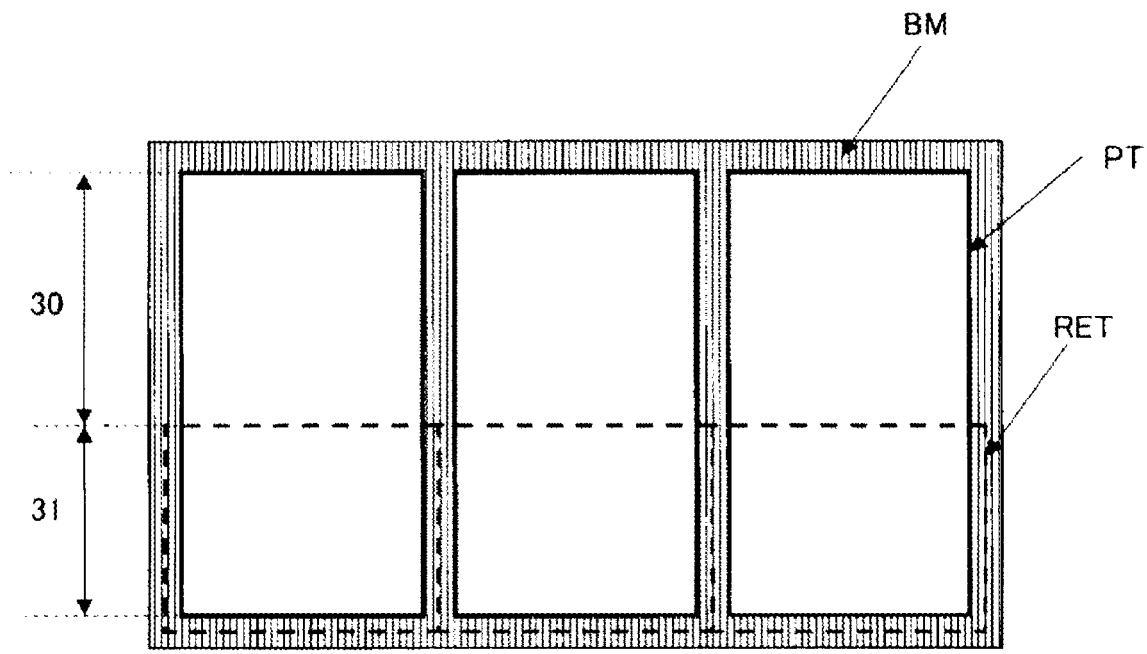
FIG. 5 is a diagram showing a light shielding film (BM) of a conventional semi-transmission type liquid crystal display device.

FIG. 4 is a diagram showing the light shielding film (BM) of the semi-transmission type liquid crystal display device according to the present embodiment, and FIG. 5 is a diagram showing the light shielding film (BM) of the conventional semi-transmission type liquid crystal display device described in the above Patent Document 1. Here, in FIGS. 4 and 5 as well as the below described FIG. 6, the regions (PT) which function as the region where one subpixel is substantially formed are shown with thick lines, and furthermore, the incorporated phase difference films (RET) are shown with broken lines.

As shown in FIG. 5, in the conventional semi-transmission type liquid crystal display device, the light shielding film (BM) is formed so as to surround one subpixel, but no light shielding film (BM) is formed in the border portion between the transmission portion 30 and the reflection portion 31.

In contrast, in the semi-transmission type liquid crystal display device according to the present embodiment, the light shielding film (BM) is formed so as to surround one subpixel, and at the same time, the light shielding film (BM) is formed in the border portion between the transmission portion 30 and the reflection portion 31.

That is to say, according to the present embodiment, the light shielding film (BM) is in a pattern having a portion which only surrounds the reflection portion 31, and thus, a resist film for an incorporated phase difference film having no gap can be formed, and therefore, the effects of repelling of the film can be reduced while the film is surrounded by the light shielding film (BM) even when repelling of the film occurs so that the incorporated phase difference film (RET) does not flow out into the transmission portion 30, and the incorporated phase difference film (RET) can be formed inside the reflection portion 31 without fail.

Here, as shown in FIG. 4(b), it is not necessary to form a light shielding film (BM) in the border between the reflection portion 31 and the reflection portion 31 between two subpixels adjacent to each other. Here, as shown in FIG. 4(b), it is necessary to surround the reflection portion 31 in the outermost portion.

Figure 6:
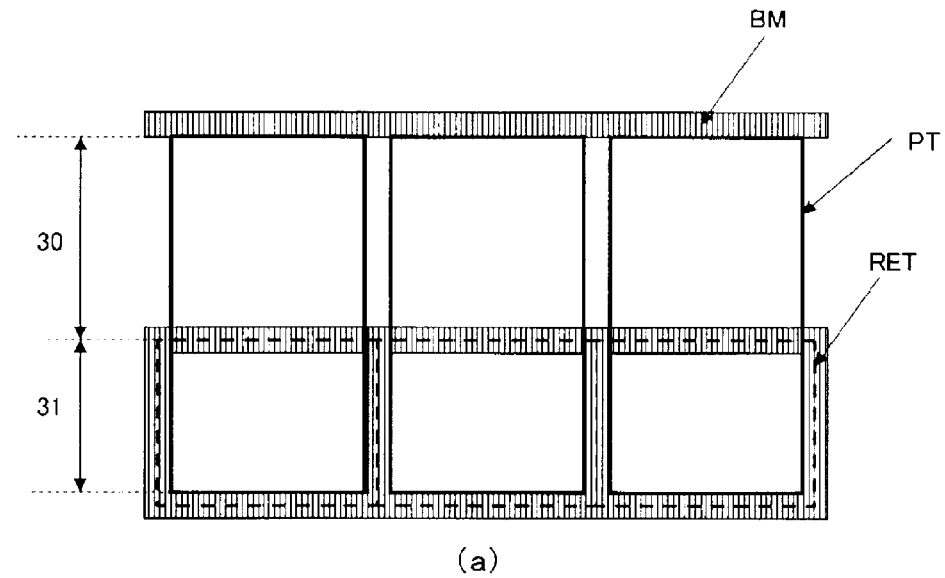
FIG. 6 is a diagram showing a modification of the light shielding film (BM) of the semi-transmission type liquid crystal display device according to an embodiment of the present invention.
Figure 6:
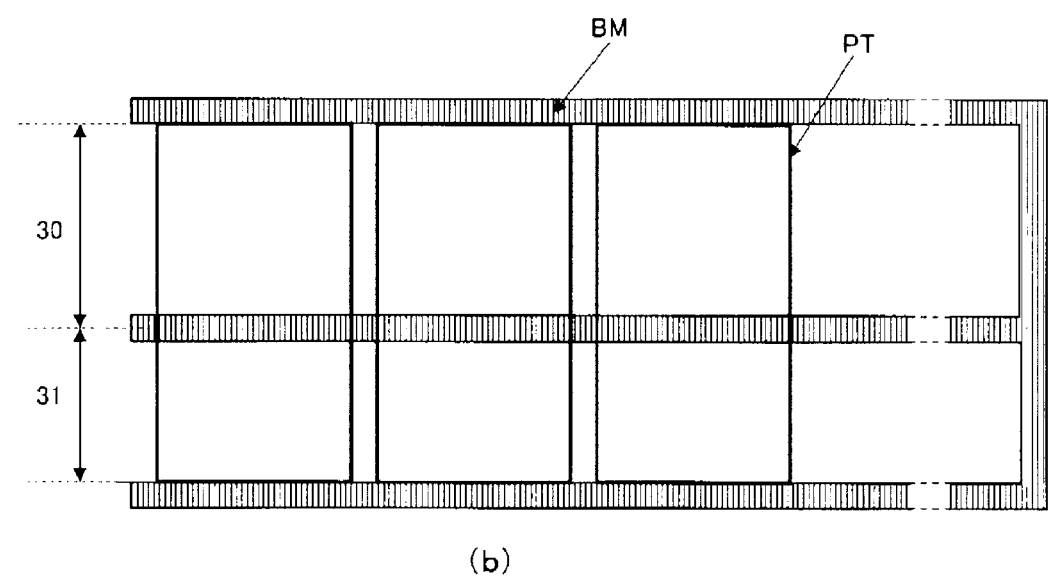
Figure 7:
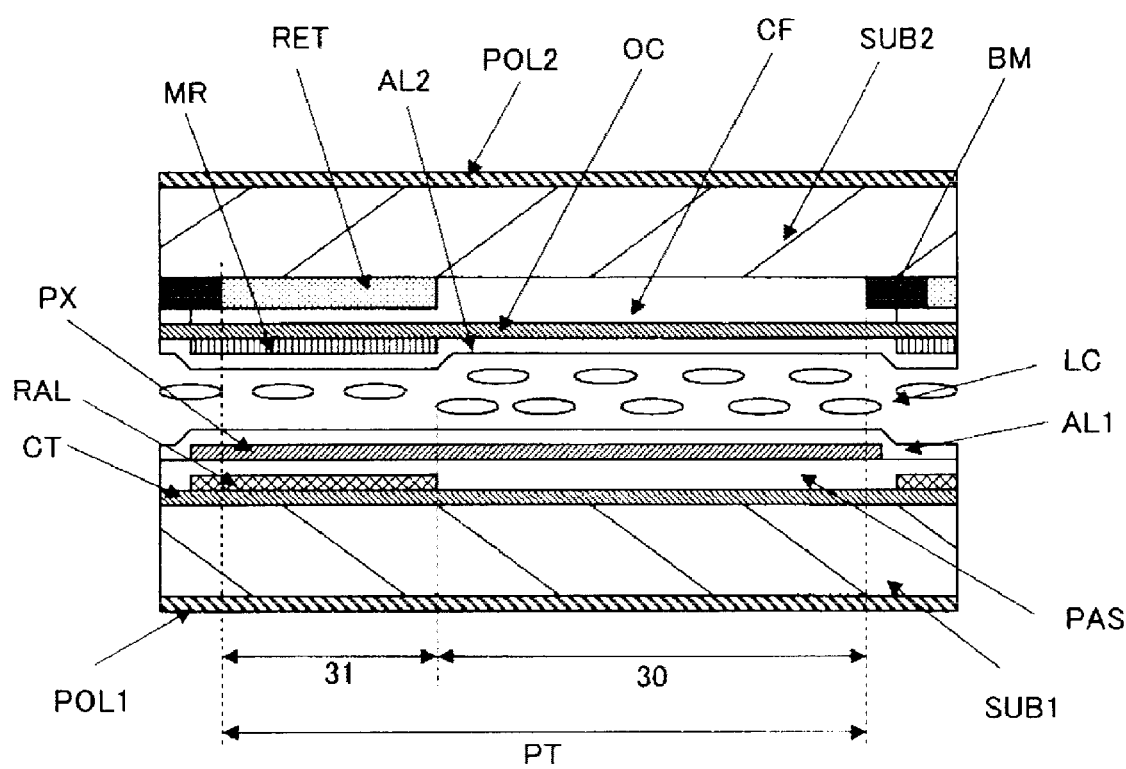
FIG. 7 is a cross sectional diagram schematically showing a main portion of the configuration of one subpixel of a conventional semi-transmission type liquid crystal display device having an IPS system.

Here, as shown in FIG. 6, the light shielding film (BM) may be formed only around the reflection portion 31. In this case, the amount of transmitted light from the backlight, which is shielded by the light shielding film (BM), can be increased, and therefore, it becomes possible to increase the brightness of the liquid crystal display panel. In addition, in the same manner as in FIG. 4(b), it is not necessary to form the light shielding film (BM) in the border between the reflection portion 31 and the reflection portion 31 between two subpixels adjacent to each other, as shown in FIG. 6(b). Here, as shown in FIG. 6(b), it is necessary to surround the reflection portion 31 in the outermost portion.

In addition, the orientation film (AL) for an incorporated phase difference film may be formed only in the region where the incorporated phase difference film (RET) is formed.

In addition to the above described effects, it is possible to gain resistance to corrosion of the incorporated phase difference film (RET) as well as coloring and decomposing prevention effects of the orientation film through irradiation with UV or DUV during the process for exposure to UV or DUV when the spacer in columnar form (SPA) is formed, for example, by using an already existing film, since in the present embodiment, the orientation film (AL) for orienting an incorporated phase difference film and the incorporated phase difference film (RET) are formed after the formation of the light shielding film (BM) on the second substrate (SUB2), and top of this, the color filter (CF) and the flattened film (OC) are formed.

As described above, in the present embodiment, the color filter (CF) and the flattened film (OC) can also be used as a protective transparent resin film for protecting the incorporated phase difference film, and therefore, the protective transparent resin film becomes unnecessary, and furthermore, it is possible to form the incorporated phase difference film (RET) without changing the conventional process for patterning through development.

In addition, the color filter (CF) and the flattened film (OC) are formed on top of the incorporated phase difference film (RET), and therefore, the flatness of the base on which the step forming layer (MR) is formed can be increased, and the control of the film thickness of the step forming layer (MR) becomes easy, and thus, it becomes easy to adjust the length of the gap between the transmission portion 30 and the reflection portion 31.

Furthermore, a sequence of processes for forming the incorporated phase difference film (RET) is arranged after the process for forming the light shielding film (BM), and thus, it becomes possible to prevent the yield from lowering due to factors caused in the process, such as the flatness of the base on which the step forming layer (MR) is formed and a foreign substance. Moreover, the light shielding film (BM) is patterned so as to have a portion which surrounds only the reflection portion 31, and thus, a resist film for an incorporated phase difference film without a gap can be formed so that it becomes possible to reduce the effects of repelling of the film.

Here, though an embodiment where the present invention is applied to a semi-transmission type liquid crystal display having an IPS system is described in the above, the present invention is not limited to this and can be applied to a semi-transmission type liquid crystal display device having an ECB system and a semi-transmission type liquid crystal display device having a VA system, for example. In these cases, the facing electrode (CT) is formed on the second substrate (SUB2) side instead of on the first substrate (SUB1) side.

Though the invention made by the present inventor is described concretely on the basis of the above described embodiments, the invention is not limited to the above described embodiments and can, of course, be modified variously within the scope of not deviating from the gist of the invention.

The invention claimed is:

1. A liquid crystal display device, comprising a pair of substrates and a liquid crystal display panel having a liquid crystal sandwiched between said pair of substrates, characterized in that
said liquid crystal display panel has a number of subpixels; and
each subpixel in said number of subpixels has a transmission portion and a reflection portion;
wherein a first substrate from among said pair of substrates has sequentially formed on a surface thereof facing said liquid crystal:
a light blocking film which is formed on said surface of said first substrate at least in a border between said transmission portion and said reflection portion and at least has a portion which surrounds said reflection portion;
an orientation film for orienting a phase difference film formed at least on a surface of said light blocking film facing said liquid crystal;
said phase difference film being formed inside the portion surrounded by said light blocking film on a surface of said orientation film facing said liquid crystal;
a color filter formed at least on a surface of said phase difference film facing said liquid crystal; and
a flattened film formed on a surface of said color filter facing said liquid crystal.

2. The liquid crystal display device according to claim 1, characterized in that
a second substrate from among said pair of substrates has a pixel electrode and a facing electrode, and
another surface of said first substrate on a side opposite to said surface facing said liquid crystal is a display surface.

3. The liquid crystal display device according to claim 2, further comprising an interlayer insulating film formed in a layer above said facing electrode, characterized in that
said pixel electrode overlaps said facing electrode and is formed in a layer above said interlayer insulating film.

4. The liquid crystal display device according to claim 2, characterized in that the second substrate from among said pair of substrates has a reflection layer formed in said reflection portion.

5. The liquid crystal display device according to claim 4, characterized in that said facing electrode is formed on said reflection layer.

6. The liquid crystal display device according to claim 1, characterized in that said orientation film is formed only in the region where said phase difference film is formed.

7. The liquid crystal display device according to claim 1, characterized by having a step forming layer which is formed in the region where said phase difference film is formed on said flattened film.

8. The liquid crystal display device according to claim 7, characterized by having a spacer in columnar form formed on said step forming layer.

9. The liquid crystal display device according to claim 1, characterized in that said phase difference film is formed of a polymer liquid crystal material.

10. The liquid crystal display device according to claim 1, characterized in that said light blocking film is formed around one subpixel and in a border between said transmission portion and said reflection portion.

11. The liquid crystal display device according to claim 1, characterized in that said light blocking film is formed only around said reflection portion.

12. The liquid crystal display device according to claim 1, characterized in that when subpixels adjacent to each other are a first subpixel and a second subpixel, no light blocking film is formed in a border between a reflection portion in said first subpixel and a reflection portion in said second subpixel.

* * * * *